(12) United States Patent
Kim et al.

(10) Patent No.: US 9,023,505 B2
(45) Date of Patent: May 5, 2015

(54) SEPARATOR AND ELECTROCHEMICAL DEVICE COMPRISING THE SAME

(71) Applicant: LG Chem, Ltd., Seoul (KR)

(72) Inventors: Kee-Young Kim, Daejeon (KR); No-Ma Kim, Daejeon (KR); Sung-Soo Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/198,240

(22) Filed: Mar. 5, 2014

(65) Prior Publication Data

US 2014/0186680 A1 Jul. 3, 2014

Related U.S. Application Data

(63) Continuation of application No. PCT/KR2013/008907, filed on Oct. 4, 2013.

(30) Foreign Application Priority Data

Oct. 5, 2012 (KR) .......................... 10-2012-0110592
Oct. 4, 2013 (KR) .......................... 10-2013-0118631

(51) Int. Cl.
*H01M 2/14* (2006.01)
*H01M 2/16* (2006.01)

(52) U.S. Cl.
CPC ............ *H01M 2/1686* (2013.01); *H01M 2/145* (2013.01); *H01M 2/16* (2013.01); *H01M 2/14* (2013.01); *H01M 2/166* (2013.01)

(58) Field of Classification Search
USPC .................. 429/129–147, 247–255; 29/623.1–623.5
See application file for complete search history.

(56) References Cited

U.S. PATENT DOCUMENTS

| 2005/0258566 A1 | 11/2005 | Naarmann et al. |
| 2010/0203396 A1 | 8/2010 | Murata |
| 2010/0325877 A1 | 12/2010 | Murata et al. |

FOREIGN PATENT DOCUMENTS

| JP | 38-58465 | 12/2006 |
| KR | 10-0923375 | 10/2009 |
| KR | 10-2009-0130885 | 12/2009 |
| KR | 10-2010-0088663 | 8/2010 |
| KR | 10-2012-0097238 | 9/2012 |

*Primary Examiner* — Basia Ridley
*Assistant Examiner* — Caitlin Wilmot
(74) *Attorney, Agent, or Firm* — McKenna Long & Aldridge LLP

(57) ABSTRACT

Provided is a separator including a porous substrate having a plurality of pores, and a porous coating layer provided on at least one surface of the porous substrate and formed from a mixture of plural inorganic particles and a binder polymer, in which the binder polymer is a result of a curing reaction of an acryl-based copolymer and an isocyanate-based crosslinking agent, and the acryl-based copolymer is a copolymer including (a) a first monomer unit with a tertiary amine group, (b) a second monomer unit with at least one functional group selected from an amine group other than a tertiary amine group, an amide group, a cyano group, and an imide group, (c) a third monomer unit of (meth)acrylate with a carboxyl group, (d) a fourth monomer unit of (meth)acrylate with a hydroxyl group, and (e) a fifth monomer unit of (meth)acrylate with an alkyl group having 1 to 14 carbon atoms, and an electrochemical device comprising the same.

18 Claims, 1 Drawing Sheet

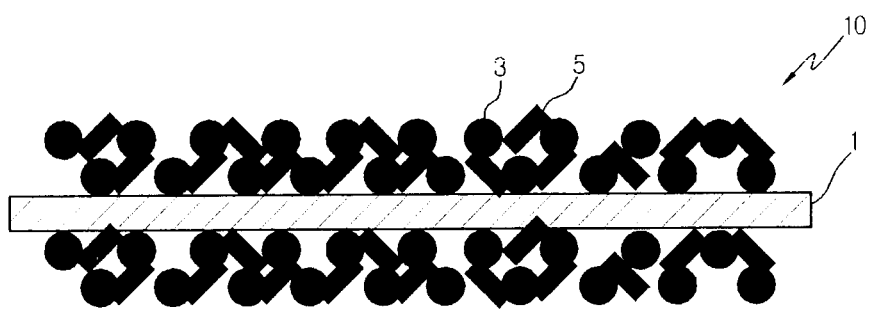

SEPARATOR AND ELECTROCHEMICAL DEVICE COMPRISING THE SAME

CROSS-REFERENCE TO RELATED APPLICATION

The present application is a continuation of International Application No. PCT/KR2013/008907 filed on Oct. 4, 2013, which claims priority to Korean Patent Application No. 10-2012-0110592 filed in the Republic of Korea on Oct. 5, 2012 and Korean Patent Application No. 10-2013-0118631 filed in the Republic of Korea on Oct. 4, 2013, the disclosures of which are incorporated herein by reference.

TECHNICAL FIELD

The present disclosure relates to a separator for an electrochemical device such as a lithium secondary battery and an electrochemical device comprising the same, and more particularly, to a separator including a porous coating layer formed from a mixture of an inorganic particle and a binder polymer on a surface of a porous substrate and an electrochemical device comprising the same.

BACKGROUND ART

Recently, there has been growing interest in energy storage technologies. As the application fields of energy storage technologies have been extended to mobile phones, camcorders, notebook computers, and even electric cars, efforts have increasingly been made towards the research and development of electrochemical devices. In this aspect, electrochemical devices have attracted the most attention. The development of secondary batteries capable of repeatedly charging and discharging has been the focus of particular interest. In recent years, extensive research and development has been conducted to design new electrodes and batteries for the purpose of improving capacity density and specific energy of the batteries.

Many secondary batteries are currently available, and among them, lithium secondary batteries developed in the early 1990's have received a great deal of attention due to their advantages of higher operating voltages and much higher energy densities than conventional batteries using aqueous electrolyte solutions, such as Ni-MH batteries, Ni—Cd batteries, and $H_2SO_4$—Pb batteries. However, such lithium ion batteries suffer from safety problems, such as fire or explosion, encountered with the use of organic electrolytes and are disadvantageously complicated to fabricate. In attempts to overcome the disadvantages of lithium ion batteries, lithium ion polymer batteries have been developed as next-generation batteries. However, additional research is still urgently needed to improve the relatively low capacities and in particular, insufficient low-temperature discharge capacities of lithium ion polymer batteries in comparison with lithium ion batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, safety regulations strictly prohibit the dangers (such as fire and smoke) of electrochemical devices. In connection with the safety characteristics of an electrochemical device, overheating of the electrochemical device may cause thermal runaway or puncture of a separator may pose an increased risk of explosion. In particular, a porous polyolefin-based substrate commonly used as a separator of an electrochemical device shows extreme thermal shrinkage behaviors at a temperature of 100° C. or higher due to its material characteristics and production processes including elongation, causing short circuits between a cathode and an anode.

Various proposals have been made to solve the above safety problems of electrochemical devices. For example, Korean Patent Publication No. 10-2009-0130885 discloses a multi-layer porous film structure having a porous layer containing an inorganic filler by applying a methacrylic acid ester-acrylic acid ester copolymer as a binder. However, the binder of the acryl-based copolymer composition disclosed in this patent does not provide a practical alternative. In particular, the disclosed composition does not guarantee reliability in durability since when the thickness of a coating is 4 μm or less based on a cross section, a delamination phenomenon of a coating layer caused by swelling of an electrolyte solution occurs due to insufficient thermal and physical stability, and in particular, low resistance against an electrolyte solution.

Meanwhile, Korean Patent No. 10-0923375 discloses a separator manufactured by supporting a thermally crosslinkable adhesive composition on a porous substrate, the thermally crosslinkable adhesive composition including polyfunctional isocyanate and a reactive polymer having a functional group capable of reacting with an isocyanate group of the polyfunctional isocyanate. However, there is a limitation in production efficiency since the composition disclosed in this patent takes 7 days to cure at 50° C., and so a large scale of additional facility investment and time for curing is required to produce.

DISCLOSURE

Technical Problem

The present disclosure is designed to solve the above problems, and therefore the present disclosure is directed to providing a separator in which a tertiary amine-based monomer and a (meth)acrylic acid monomer is introduced to an acryl-based copolymer composition and serves as a catalyst during curing with isocyanate, thereby remarkably reducing a curing rate, so that a porous coating layer including an inorganic filler provides physical stability and thermal stability of the separator to ensure reliability in durability against an internal short circuit, and an electrochemical device comprising the same.

Technical Solution

In one aspect of the present disclosure, there is provided a separator including a porous substrate of a planar shape having a plurality of pores, and a porous coating layer provided on at least one surface of the porous substrate and formed from a mixture of plural inorganic particles and a binder polymer, in which the binder polymer includes a result of a curing reaction of an acryl-based copolymer and an isocyanate-based crosslinking agent, the acryl-based copolymer is a copolymer including (a) a first monomer unit with a tertiary amine group, (b) a second monomer unit with at least one functional group selected from an amine group other than a tertiary amine group, an amide group, a cyano group, and an imide group, (c) a third monomer unit of (meth)acrylate with a carboxyl group, (d) a fourth monomer unit of (meth)acrylate with a hydroxyl group, and (e) a fifth monomer unit of (meth)acrylate with an alkyl group having 1 to 14 carbon atoms, and a content of the first monomer unit is 0.5 to 20 parts by weight, a content of the second monomer unit is 30 to 60 parts by weight, a content of the third monomer unit is 0.1 to 2 parts by weight, a content of the fourth monomer unit is 0.5 to 10 parts by weight, and a content of the fifth monomer unit is 8 to 68 parts by weight, based on the total acryl-based copolymer.

A content of the isocyanate-based crosslinking agent may be 0.1 to 10 parts by weight based on 100 parts by weight of the acryl-based copolymer.

The first monomer unit may be derived from at least one monomer selected from the group consisting of 2-(diethylamino)ethyl(meth)acrylate, 2-(dimethylamino)ethyl(meth)acrylate, 3-(diethylamino)propyl(meth)acrylate, and 3-(dimethylamino)propyl(meth)acrylate.

The second monomer unit may be derived from at least one monomer selected from the group consisting of 2-(((butoxyamino)carbonyl)oxy)ethyl(meth)acrylate, methyl 2-acetamido(meth)acrylate, 2-(meth)acrylamidoglycolic acid, 2-(meth)acrylamido-2-methyl-1-propanesulfonic acid, (3-(meth)acrylamidopropyl)trimethylammonium chloride, N-(meth)acryloylamido-ethoxyethanol, 3-(meth)acryloylamino-1-propanol, N-(butoxymethyl)(meth)acrylamide, N-tert-butyl(meth)acrylamide, diacetone(meth)acrylamide, N,N-dimethyl(meth)acrylamide, N-(isobutoxymethyl)acrylamide, N-(isopropyl)(meth)acrylamide, (meth)acrylamide, N-phenyl(meth)acrylamide, N-(tris(hydroxymethyl)methyl)(meth)acrylamide, N-vinylpyrrolidinone, N,N'-(1,3-phenylene)dimaleimide, N,N'-(1,4-phenylene)dimaleimide, N,N'-(1,2-dihydroxyethylene)bisacrylamide, N,N'-ethylenebis(meth)acrylamide, 4-(meth)acryloyl morpholine, (meth)acrylonitrile, 2-(vinyloxy)ethanenitrile, 2-(vinyloxy)propanenitrile, cyanomethyl(meth)acrylate, cyanoethyl(meth)acrylate, and cyanopropyl(meth)acrylate.

The third monomer unit may be derived from at least one monomer selected from the group consisting of (meth)acrylic acid, 2-(meth)acryloyloxy acetic acid, 3-(meth)acryloyloxy propylic acid, 4-(meth)acryloyloxy butyric acid, an acrylic acid dimer, itaconic acid, maleic acid, and maleic anhydride.

The fourth monomer unit may be derived from at least one monomer selected from the group consisting of 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate, and 2-hydroxypropyleneglycol(meth)acrylate.

The fifth monomer unit may be derived from at least one monomer selected from the group consisting of methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylbutyl(meth)acrylate, 2-ethylhexyl(meth)acrylate, n-octyl(meth)acrylate, isooctyl(meth)acrylate, isononyl(meth)acrylate, lauryl(meth)acrylate, and tetradecyl(meth)acrylate.

The isocyanate-based crosslinking agent may be at least one selected from the group consisting of 4,4-methylenebis-dicyclohexyl diisocyanate, hexamethylene diisocyanate (HDI), isophorone diisocyanate (IPDI), methylenebis(cyclohexyl isocyanate), trimethyl hexamethylene diisocyanate (TMDI), meta-tetramethylxylylene diisocyanate (TMXDI), cyclohexylene diisocyanate, toluene diisocyanate (TDI), diphenylmethane-4,4-diisocyanate (MDI), naphthalene-1,5-diisocyanate (NDI), 3,3-dimethyl 4,4-biphenylene diisocyanate (TODI), xylylene diisocyanate (XDI), and phenylene diisocyanate, or results of reaction with polyol thereof.

The binder polymer may further include any one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, or mixtures thereof.

The inorganic particles may have a particle size of 0.001 to 10 μm.

The inorganic particles may be selected from the group consisting of an inorganic particle having a dielectric constant greater than or equal to 5, an inorganic particle having an ability to transport lithium ions, and a mixture thereof.

The inorganic particle having the dielectric constant greater than or equal to 5 may be at least one selected from the group consisting of $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, and $TiO_2$.

The inorganic particle having the ability to transport lithium ions may be at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ based glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ based glass ($Li_xSi_yS_z$, $0<x<3$, $0<y<2$, $0<z<4$) such as $Li_3PO_4$—$Li_2S$—$SiS_2$, and $P_2S_5$ based glass ($Li_xP_yS_z$, $0<x<3$, $0<y<3$, $0<z<7$) such as $LiI$—$Li_2S$—$P_2S_5$.

A content of the binder polymer may be 2 to 30 parts by weight based on 100 parts by weight of the inorganic particles.

The porous coating layer may have a thickness of 0.5 to 10 μm.

The porous substrate may be formed from at least one selected from the group consisting of polyolefin, polyethylene terephthalate, polybutylene terephthalate, polyacetal, polyamide, polycarbonate, polyimide, polyether ether ketone, polyethersulfone, polyphenylene oxide, polyphenylene sulfide, and polyethylene naphthalene.

In another aspect of the present disclosure, there is also provided an electrochemical device including a cathode, an anode, and a separator interposed between the cathode and the anode, in which the separator is the above mentioned separator.

The electrochemical device may be a lithium secondary battery.

Advantageous Effects

According to one aspect of the present disclosure, provided is a separator having a coating layer that has a price competitive advantage in manufacturing by replacing a conventional fluoro-based binder with an acryl-based copolymer binder and increases crosslinking efficiency by introducing a curing acceleration monomer as a component of the acryl-based copolymer binder, to suppress a phenomenon in which the coating layer is delaminated in an electrolyte solution within a short period of time, thereby ensuring excellent physical stability, thermal stability, and reliability in durability against an internal short circuit.

An uncrosslinked binder tends to dissolve in an electrolyte solution as polymer chains move freely and are untangled in the electrolyte solution. However, a crosslinked binder loses its ability to move freely in an electrolyte solution at crosslinked portions and rather forms such domains to maintain a polymer matrix in the electrolyte solution, and thus is excellent in resistance against the electrolyte solution. Accordingly, as a crosslinking degree of the binder is higher, an effect of preventing delamination in the electrolyte solution is improved, and when the acryl-based polymer binder composition of the present disclosure is applied, a crosslinking degree of the binder after manufacturing the separator is 90% or more, and a period of time taken to reach the crosslinking degree higher than or equal to 90% is within 15 minutes during a heating process.

DESCRIPTION OF DRAWINGS

Other objects and aspects of the present disclosure will become apparent from the following descriptions of the embodiments with reference to the accompanying drawing in which:

FIG. 1 is a schematic cross-sectional view of a separator having a porous coating layer.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

A separator according to one aspect of the present disclosure includes a porous substrate of a planar shape having a plurality of pores, and a porous coating layer provided on at least one surface of the porous substrate and formed from a mixture of plural inorganic particles and a binder polymer, in which the binder polymer includes a result of a curing reaction of an acryl-based copolymer and an isocyanate-based crosslinking agent.

The acryl-based copolymer is a copolymer including (a) a first monomer unit with a tertiary amine group, (b) a second monomer unit with at least one functional group selected from an amine group other than a tertiary amine group, an amide group, a cyano group, and an imide group, (c) a third monomer unit of (meth)acrylate with a carboxyl group, (d) a fourth monomer unit of (meth)acrylate with a hydroxyl group, and (e) a fifth monomer unit of (meth)acrylate with an alkyl group having 1 to 14 carbon atoms.

The content of the first monomer unit is 0.5 to 20 parts by weight, the content of the second monomer unit is 30 to 60 parts by weight, the content of the third monomer unit is 0.1 to 2 parts by weight, the content of the fourth monomer unit is 0.5 to 10 parts by weight, and the content of the fifth monomer unit is 8 to 68 parts by weight, based on the total acryl-based copolymer.

The binder polymer constituting the porous coating layer of the separator includes the result of a curing reaction of the acryl-based copolymer and the isocyanate-based crosslinking agent.

Generally, an acryl-based copolymer is apt to swell in an electrolyte solution because an acryl-based copolymer prepared by a typical polymerization method yields a vulnerable amorphous polymer. Accordingly, in the manufacture of a separator, a coating layer of an acryl-based copolymer has a high degree of swelling in an electrolyte solution, allows a sufficient passage of lithium ions, and shows a characteristic of low electrical resistance. However, resistance against an electrolyte solution is low because the coating layer is apt to swell in the electrolyte solution, so that the coating layer may be easily delaminated from the porous substrate, causing deterioration of durability. As a result, the separator according to one aspect of the present disclosure is intended to remedy a shortcoming of an amorphous polymer through crosslinking of an acryl-based copolymer. Meanwhile, since a general porous substrate using a raw material such as plyolefin is vulnerable at high temperature of 120° C. or higher due to heat resistance characteristics, crosslinking of an acryl-based copolymer coated on a porous substrate should be performed at 120° C. or less, and for crosslinking of an acryl-based copolymer, a long-term curing reaction at low temperature is required, so that there may be a limitation in terms of productivity.

However, the acryl-based copolymer constituting the coating layer of the separator according to one aspect of the present disclosure includes the first monomer unit with the tertiary amine group and the third monomer unit of (meth)acrylate with the carboxyl group, and these monomer units function as a catalyst during the curing reaction of the acryl-based copolymer and the isocyanate-based crosslinking agent and thus provide excellent urethane curing efficiency.

The acryl-based copolymer may encompass all types of copolymers including a random copolymer, a block copolymer, and the like, if it is a copolymer including the first monomer unit through the fifth monomer unit described in the foregoing.

The first monomer unit through the fifth monomer unit included in the acryl-based copolymer provides a high adhesive strength between inorganic matters or between an inorganic matter and a porous substrate. Also, the porous coating layer formed using this shows few defects and a high packing density. Accordingly, the use of the separator according to one aspect of the present disclosure facilitates implementation of a thin film battery, ensures high stability against an external impact, and alleviates a detachment phenomenon of the inorganic particles.

The first monomer unit with the tertiary amine group on the side chain may be derived from one or more monomer selected from the group consisting of 2-(diethylamino)ethyl (meth)acrylate, 2-(dimethylamino)ethyl(meth)acrylate, 3-(diethylamino)propyl(meth)acrylate, and 3-(dimethylamino)propyl(meth)acrylate.

The second monomer unit with at least one functional group selected from the amine group other than the tertiary amine group, the amide group, the cyano group, and the imide group on the side chain may be derived from one or more monomer selected from the group consisting of 2-(((butoxyamino)carbonyl)oxy)ethyl(meth)acrylate, methyl 2-acetamido(meth)acrylate, 2-(meth)acrylamidoglycolic acid, 2-(meth)acrylamido-2-methyl-1-propanesulfonic acid, (3-(meth)acrylamidopropyl)trimethylammonium chloride, N-(meth)acryloylamido-ethoxyethanol, 3-(meth)acryloylamino-1-propanol, N-(butoxymethyl)(meth)acrylamide, N-tert-butyl(meth)acrylamide, diacetone(meth)acrylamide, N,N-dimethyl(meth)acrylamide, N-(isobutoxymethyl)acrylamide, N-(isopropyl)(meth)acrylamide, (meth)acrylamide, N-phenyl(meth)acrylamide, N-(tris(hydroxymethyl)methyl)

(meth)acrylamide, N-vinylpyrrolidinone, N,N'-(1,3-phenylene)dimaleimide, N,N'-(1,4-phenylene)dimalcimide, N,N'-(1,2-dihydroxyethylene)bisacrylamide, N,N'-ethylenebis(meth)acrylamide, 4-(meth)acryloyl morpholine, (meth)acrylonitrile, 2-(vinyloxy)ethanenitrile, 2-(vinyloxy) propanenitrile, cyanomethyl(meth)acrylate, cyanoethyl (meth)acrylate, and cyanopropyl(meth)acrylate.

The third monomer unit of (meth)acrylate with the carboxyl group on the side chain may be derived from one or more monomer selected from the group consisting of (meth) acrylic acid, 2-(meth)acryloyloxy acetic acid, 3-(meth)acryloyloxy propylic acid, 4-(meth)acryloyloxy butyric acid, an acrylic acid dimer, itaconic acid, maleic acid, and maleic anhydride.

The fourth monomer unit of (meth)acrylate with the hydroxyl group on the side chain may be derived from one or more monomer selected from the group consisting of 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate, and 2-hydroxypropyleneglycol(meth)acrylate.

The fifth monomer unit of (meth)acrylate with the alkyl group having 1 to 14 carbon atoms may be derived from a monomer using methyl(meth)acrylate, ethyl(meth)acrylate, n-propyl(meth)acrylate, isopropyl(meth)acrylate, n-butyl (meth)acrylate, t-butyl(meth)acrylate, sec-butyl(meth)acrylate, pentyl(meth)acrylate, 2-ethylbutyl(meth)acrylate, 2-ethylhexyl(meth)acrylate, n-octyl(meth)acrylate, isooctyl (meth)acrylate, isononyl(meth)acrylate, lauryl(meth)acrylate, and tetradecyl(meth)acrylate, singularly or in combination. In this instance, when the number of carbon atoms included in the alkyl group of the filth monomer unit is greater than 14, the alkyl group becomes excessively long, and accordingly, a degree of non-polarity increases, resulting in reduced packing density of the porous coating layer.

In the separator of the present disclosure, the content of the first monomer unit may be 0.5 to 20 parts by weight, more preferably, 1 to 15 parts by weight, based on the total copolymer. When the content satisfies this range, a curing reaction rate of the acryl-based copolymer and the isocyanate-based crosslinking agent may be shortened and the packing density of the porous coating layer may be improved. Also, a reduction in adhesive strength with a polyolefin porous film when the molecular weight of the acryl-based copolymer is reduced to less than 100,000 may be prevented from occurring.

The content of the second monomer unit may be 30 to 60 parts by weight, more preferably, 35 to 55 parts by weight, based on the total copolymer. When the content satisfies this range, the packing density of the porous coating layer and the adhesive strength may be improved and an excessive increase in electrical resistance may be prevented.

The content of the third monomer unit may be 0.1 to 2 parts by weight, more preferably, 0.5 to 1.5 parts by weight, based on the total copolymer. When the content satisfies this range, a curing reaction of the acryl-based copolymer and the isocyanate-based crosslinking agent may be accelerated, a side reaction of the monomer and the electrolyte solution may be suppressed, and an excessive increase in electrical resistance may be prevented.

The content of the fourth monomer unit may be 0.5 to 10 parts by weight, more preferably, 1 to 8 parts by weight, based on the total copolymer. When the content satisfies this range, the content of the hydroxyl group causing a curing reaction with the isocyanate-based crosslinking agent may be properly controlled, a reduction in adhesive strength of the copolymer may be prevented, a delamination phenomenon in the electrolyte solution may be suppressed due to a proper content of the crosslinking agent in the copolymer, and physical stability and thermal stability of the separator may be improved.

Also, the content of the fifth monomer unit may be 8 to 68 parts by weight, more preferably, 20 to 63 parts by weight, based on the total copolymer. When the content satisfies this range, the adhesive strength with the porous substrate may be improved and the packing characteristic of the porous coating layer may be improved.

In the separator of the present disclosure, the copolymer may further include a monomer unit with a crosslinkable functional group other than the fourth monomer unit of (meth)acrylate with the hydroxyl group, to control the crosslinking degree of the binder polymer to further improve physical and thermal stability of the separator. As the additional crosslinkable functional group, an epoxy group, an oxetane group, an imidazole group, an oxazoline group, and the like may be exemplified.

Meanwhile, the crosslinkable functional group of the acryl-based copolymer causes a curing reaction with the isocyanate-based crosslinking agent, and as a result, a binder polymer is obtained.

The isocyanate-based crosslinking agent may be at least one selected from the group consisting of 4,4-methylenebisdicyclohexyl diisocyanate, hexamethylene diisocyanate (HDI), isophorone diisocyanate (IPDI), methylenebis(cyclohexyl isocyanate), trimethyl hexamethylene diisocyanate (TMDI), meta-tetramethylxylylene diisocyanate (TMXDI), cyclohexylene diisocyanate, toluene diisocyanate (TDI), diphenylmethane-4,4-diisocyanate (MDI), naphthalene-1,5-diisocyanate (NDI), 3,3-dimethyl 4,4-biphenylene diisocyanate (TODI), xylylene diisocyanate (XDI), and phenylene diisocyanate, or results of reaction with polyol thereof.

The polyol may be, for example, polyol having 2 to 4 hydroxyl groups, and may include a low molecular weight polyol having a molecular weight less than about 1,000 g/mol and a high molecular weight polyol having a molecular weight of about 1,000 g/mol to 4,000 g/mol. As a specific example, the low molecular weight polyol may be a diol, a triol, and a tetraol, and may include ethylene glycol, 1,2-propylene glycol, 1,4-butane diol, trimethylolpropane, ditrimethylolpropane, trimethylolethane, glycerol, pentaerythritol, and sorbitol. Other polyols may include etherpolyol, for example, diethylene glycol, ethoxylated bisphenol A, and the like.

Also, the high molecular weight polyol may include polyether-based polyols including polyethylene glycol (PEG), polypropylene glycol (PPG), polytetramethylene glycol (PTMG), and the like, and polyester-based polyols polybutylene adipate and the like.

The content of the isocyanate-based crosslinking agent is, for example, 0.1 to 10 parts by weight or 1 to 10 parts by weight based on 100 parts by weight of the acryl-based copolymer. When the content satisfies this range, the crosslinking density of the binder polymer excessively increases and thereby a handling problem may be prevented, a delamination phenomenon in the electrolyte solution may be suppressed within a short period of time, and the porous coating layer may be formed with improved physical stability.

In addition to the isocyanate-based crosslinking agent, copolymer crosslinking may be performed by adding a curing agent such as an epoxy compound, an oxetane compound, an aziridine compound, a metal chelating agent, and the like.

Additionally, the copolymer may further include another monomer unit so long as the objects of the present disclosure are not impaired. To improve ion conductivity of the separator, a (meth)acrylic acid alkylene oxide adduct may be additionally copolymerized, for example, alkoxy diethylene glycol(meth)acrylic acid ester having 1 to 8 carbon atoms, alkoxy triethylene glycol(meth)acrylic acid ester, alkoxy tetraethylene glycol(meth)acrylic acid ester, phenoxy diethylene glycol(meth)acrylic acid ester, alkoxy dipropylene glycol (meth)acrylic acid ester, alkoxy tripropylene glycol(meth) acrylic acid ester, and phenoxy dipropylene glycol(meth) acrylic acid ester.

Also, it will be obvious to those skilled in the art that binder polymers other than the binder polymer described in the foregoing may be also used so long as the objects of the present disclosure are not impaired.

As the binder polymer, a polymer conventionally used in the art to form a porous coating layer may be used. Particularly, a polymer having a glass transition temperature (Tg) of −200 to 200☐ may be used to improve the mechanical properties of the resulting porous coating layer such as flexibility and elasticity.

Non-limiting examples of the binder polymer may include polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, and the like.

In the separator of the present disclosure, the inorganic particles used to form the porous coating layer are not limited to a specific type if they are electrochemically stable. That is, the inorganic particles usable in the present disclosure are not limited to a specific type if they do not undergo oxidation and/or reduction in an operating voltage range of an electrochemical device to be applied, for example, a range of 0 to 5V for Li/Li$^+$. In particular, when an inorganic particle having an ability to transport ions is used, conductivity of ions in an electrochemical device may be increased, contributing to improvement of performance.

Also, the use of an inorganic particle having a high dielectric constant as the inorganic particle can contribute to an increase in the degree of dissociation of an electrolyte salt, for example, a lithium salt, in a liquid electrolyte to improve ionic conductivity of the electrolyte solution.

For these reasons, the inorganic particles preferably include an inorganic particle having a dielectric constant greater than or equal to 5, preferably, greater than or equal to 10, an inorganic particle having an ability to transport lithium ions, or a mixture thereof. Non-limiting examples of the inorganic particle having the dielectric constant greater than or equal to 5 include $BaTiO_3$, $Pb(Zr,Ti)O_3$ (PZT), $Pb_{1-x}La_xZr_{1-y}Ti_yO_3$(PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, and $TiO_2$, singularly or in combination.

Particularly, preferred inorganic particles are $BaTiO_3$, $Pb(Zr,TiO_3$ (PZT), $Pb_{1-x}La_xZr_{1-y}Ti_yO_3$(PLZT, $0<x<1$, $0<y<1$), $Pb(Mg_{1/3}Nb_{2/3})O_3$—$PbTiO_3$(PMN-PT), and hafnia ($HfO_2$), whose dielectric constants are higher than or equal to 100 that have piezoelectricity to protect both electrodes from internal short circuits when an external impact is applied, ensuring improved safety of an electrochemical device. Piezoelectricity is a phenomenon in which charges created as a result of tension or compression under a certain pressure to generate a potential difference between opposite sides. The use of a mixture of the inorganic particles having the high dielectric constant and the inorganic particles having the ability to transport lithium ions can produce enhanced synergistic effects.

In one aspect of the present disclosure, the inorganic particle having the ability to transport lithium ions refer to an inorganic particle that contain lithium atoms and have a function of transferring a lithium ion without storing lithium. The inorganic particle having the ability to transport lithium ions can transfer and move a lithium ion due to a so-called defect present within its structure, thereby conductivity of lithium ions in a battery may be improved, contributing to battery performance improvement. Non-limiting examples of the inorganic particle having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ based glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ based glass ($Li_xSi_yS_z$, $0<x<3$, $0<y<2$, $0<z<4$) such as $Li_3PO_4$—$Li_2S$—$SiS_2$, and $P_2S_5$ based glass ($Li_xP_yS_z$, $0<x<3$, $0<y<3$, $0<z<7$) such as $LiI$—$Li_2S$—$P_2S_5$, or mixtures thereof.

In the separator according to one aspect of the present disclosure, the particle size of the inorganic particle of the porous coating layer is not limited but is preferably in the range of 0.001 to 10 μm for a uniform thickness and an optimal porosity of the coating layer. When the particle size is less than 0.001 μm, dispersibility may deteriorate, which makes it difficult to control the properties of the separator, and when the particle size exceeds 10 μm, the thickness of the porous coating layer increases, which may deteriorate the mechanical properties, and the pore size is excessively increased, which may increase the probability that internal short circuits will be caused during charging and discharging of a battery.

The content of the binder polymer in the porous coating layer of the separator according to one aspect of the present disclosure is preferably 2 to 30 parts by weight or 5 to 15 parts by weight based on 100 parts by weight of the inorganic particles. When the content satisfies this range, a problem such as detachment of the inorganic particles may be prevented, and a phenomenon in which resistance increases due to the clogging of the pores of the porous substrate in the presence of the binder polymer in excess may be suppressed, and the porosity of the porous coating layer may be improved.

In the separator according to one aspect of the present disclosure, the packing density D of the porous coating layer may be defined as the density of the porous coating layer loaded at a height of 1 μm from the porous substrate per unit area (m$^2$) of the porous substrate, and in this instance, D may range $0.40 \times D_{inorg} \leq D \leq 0.70 \times D_{inorg}$ or $0.50 \times D_{inorg} \leq D \leq 0.70 \times D_{inorg}$, where $D=(Sg-Fg)/(St-Ft)$, Sg is the weight (g) per unit area (m$^2$) of the separator in which the porous coating layer is formed on the porous substrate, Fg is the weight (g) of the unit area (m$^2$) of the porous substrate, St is the thickness (μm) of the separator in which the porous coating layer is formed on the porous substrate, Ft is the thickness (μm) of the porous substrate, and $D_{inorg}$ is the density (g/m$^2$×μm) of the inorganic particles used. When two or more types of inorganic particles are used, $D_{inorg}$ is determined taking into consideration the densities and fractions of the individual type of inorganic particles.

When D satisfies this range, problems of the porous coating layer becoming structurally loose and losing its function to suppress thermal shrinkage of the porous substrate or its resistance to mechanical impact may be prevented, and the physical properties and porosity of the porous coating layer may be improved due to the increased packing density, leading to an improvement in electrical conductivity of the separator.

The thickness of the porous coating layer composed of the inorganic particles and the binder polymer is not specifically limited but may be in the range of 0.5 to 10 μm or 1 to 7 μm.

Also, in the separator according to one aspect of the present disclosure, as the porous substrate having a plurality of pores, any porous substrate that can be commonly used in electrochemical devices may be used, for example, a porous substrate formed from at least one of polyolefin, polyethylene terephthalate, polybutylene terephthalate, polyacetal, polyamide, polycarbonate, polyimide, polyether ether ketone, polyethersulfone, polyphenylene oxide, polyphenylene sulfide, and polyethylene naphthalene. The porous substrate may be in the form of a membrane or a non-woven fabric. The thickness of the porous substrate may range, for example, from 5 to 50 μm but is not particularly limited to this range, and the pore size and porosity of the porous substrate may range, for example, from 0.01 to 50 μm and from 10 to 95%, respectively, but are not particularly limited to these ranges.

An exemplary method of manufacturing the separator coated with the porous coating layer according to one aspect of the present disclosure is illustrated below, but is not limited thereto.

First, a mixture of the first through fifth monomers is put in a reactor allowing the flow-back of nitrogen gas, and subsequently, a solvent such as acetone, ethylacetate, and the like is put. Next, after purging nitrogen gas for oxygen removal, a polymerization reaction is performed for 24 to 48 hours by putting a polymerization initiator such as azobisisobutyronitrile (AIBN) and a polymerization regulator such as normal dodecyl mercaptan, while maintaining the temperature of the reactor in a range of 48 to 52° C. When the reaction is completed, an acryl-based polymer is obtained by diluting with acetone and the like.

Next, a binder polymer solution is prepared by dissolving the obtained acryl-based copolymer and an isocyante-based crosslinking agent in a solvent.

Subsequently, inorganic particles are added to and dispersed in the binder polymer solution. As the solvent, a solvent having a solubility parameter similar to that of the binder polymer intended to use and having a low boiling point may be selected. This is for uniform mixing and ease of subsequent removal of the solvent. Non-limiting examples of available solvents include acetone, tetrahydrofuran, methylene chloride, chloroform, dimethylformamide, N-methyl-2-pyrrolidone (NMP), cyclohexane, water, or blends thereof. After the inorganic particles are added to the binder polymer solution, crushing of the inorganic particles may be performed. In this instance, a preferred crushing time is 1 to 20 hr, and a particle size of the crushed inorganic particles may be 0.001 to 10 μm as described in the foregoing. As the crushing method, a conventional method may be used, and for example, a ball milling method may be applied.

Subsequently, the binder polymer solution containing the inorganic particles dispersed therein is coated onto a porous substrate under the humidity condition of 10 to 80%, and curing and drying reactions are performed under the temperature condition of 70 to 100° C. for 5 to 15 minutes or 5 to 10 minutes.

A method of coating the binder polymer solution containing the dispersed inorganic particles onto the porous substrate may use a conventional coating method known in the art, and various methods may be used, for example, dip coating, die coating, roll coating, comma coating, or combinations thereof. Also, the porous coating layer may be selectively formed on either one or both surfaces of the porous substrate.

Referring to FIG. 1, according to one aspect of the present disclosure, a separator 10 having a porous coating layer formed by coating a mixture of inorganic particles 3 and a binder polymer 5 on at least one surface of a porous substrate 1 having a plurality of pores, followed by curing and drying, is illustrated.

The resulting separator of the present disclosure may be used as a separator of an electrochemical device. That is, the separator according to one aspect of the present disclosure may be useful as a separator interposed between a cathode and an anode.

The electrochemical device includes all devices facilitating electrochemical reactions, for example, all types of primary and secondary batteries, fuel cells, solar cells, capacitors such as supercapacitors, and the like. Particularly, among the secondary batteries, lithium secondary batteries including lithium metal secondary batteries, lithium ion secondary batteries, lithium polymer secondary batteries, lithium ion polymer secondary batteries, and the like, may be applied.

The electrochemical device may be fabricated by a conventional method known in the art, and for example, the electrochemical device may be fabricated by interposing the separator between a cathode and an anode, assembling the electrode structure, and injecting an electrolyte solution into the electrode assembly.

There is no special limitation on the electrode to be applied together with the separator according to one aspect of the present disclosure, and the electrode may be produced in a manner of binding an electrode active material to an electrode current collector by a conventional method known in the art.

In the electrode current collector, non-limiting examples of a cathode active material include a conventional cathode active material that can be commonly used in a cathode of an electrochemical device, in particular, lithiated manganese oxide, lithiated cobalt oxide, lithiated nickel oxide, lithiated iron oxide, and composite oxides thereof. Non-limiting examples of an anode active material include a conventional anode active material that can be commonly used in an anode of an electrochemical device, in particular, lithium metals or lithium alloys and lithium intercalation materials such as carbon, petroleum coke, activated carbon, graphite, and other carbon materials.

Non-limiting examples of a cathode current collector include an aluminum foil, a nickel foil, or a combination thereof. Non-limiting examples of an anode current collector include a copper foil, a gold foil, a nickel foil, a copper alloy foil, or combinations thereof.

The electrolyte solution that can be used in the electrochemical device according to one aspect of the present disclosure may be an electrolyte solution in which a salt is dissolved or dissociated in an organic solvent, the salt having a structure represented by $A^+B^-$ wherein $A^+$ is an alkali metal cation such as $Li^+$, $Na^+$, $K^+$, or combinations thereof, and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or combinations thereof, and the organic solvent including, but not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or mixtures thereof.

The injection of the electrolyte solution may be performed in any suitable step of a battery fabrication process based on a manufacturing process and required physical properties of a final product. That is, the injection of the electrolyte solution may be applied before battery assembly or in the final step of battery assembly.

According to one aspect of the present disclosure, a process of applying the separator to the battery may include a lamination/stacking process of the separator and the electrode and a folding process as well as a general winding process The separator according to one aspect of the present disclosure has excellent resistance to peeling, so that the inorganic particles are resistant to detachment during the battery assembly process described in the foregoing.

Hereinafter, embodiments of the present disclosure will be described in detail. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

Preparation of Acryl-Based Copolymer

Preparation Example 1

A monomer mixture of 55.5 parts by weight of ethylacrylate, 15 parts by weight of acrylonitrile, 20 parts by weight of N,N-dimethylacrylamide, 5 parts by weight of 2-(dimethylamino)ethylacrylate, 4 parts by weight of 4-hydroxybutyl acrylate, and 0.5 parts by weight of acrylic acid was put in a 1 L reactor that allows the flow-back of nitrogen gas and is equipped with a cooling device to control the temperature, and subsequently, 100 parts by weight of acetone was put as a solvent. Subsequently, after purging nitrogen gas for 1 hour with an aim to remove oxygen, the temperature was maintained at 50□. Subsequently, 0.03 parts by weight of azobisisobutyronitrile (AIBN) as a polymerization initiator and 0.05 parts by weight of normal dodecyl mercaptan (DDM) as a polymerization regulator were put to cause a reaction for 24 hours. After the reaction was completed, a reaction result was diluted with acetone, yielding an acryl-based copolymer having a solid concentration of 25 weight % and a weight average molecular weight of 330,000 g/mol.

Preparation Examples 2 Through 9

Acryl-based copolymers of Preparation examples 2 through 9 were prepared by the same method as Preparation example 1, using the monomers of the content ratio (weight ratio) shown in Table 1. The weight average molecular weights of the prepared copolymers were such as shown in Table 1. Also, numerical values for each monomer are indicated in parts by weight.

TABLE 1

| | Preparation example 1 | Preparation example 2 | Preparation example 3 | Preparation example 4 | Preparation example 5 | Preparation example 6 | Preparation example 7 | Preparation example 8 | Preparation example 9 |
|---|---|---|---|---|---|---|---|---|---|
| DMAAm | 20 | 20 | 35 | 30 | 24 | 24 | 35 | 35 | 35 |
| AN | 15 | 10 | 15 | 20 | 15 | 15 | 15 | 15 | 15 |
| DMAEA | 5 | 20 | — | 5 | — | 10 | 10 | 4 | 4 |
| DMAPA | — | — | 5 | — | — | — | — | — | — |
| AA | 0.5 | 1.5 | 0.5 | 1 | — | — | 2 | 0.5 | — |
| HBA | 4 | 8 | 4 | 1 | 4 | 4 | — | 15 | — |
| EA | 55.5 | 40.5 | 35.5 | 38 | 57 | 47 | 38 | 30.5 | 46 |
| BA | — | — | 5 | 5 | — | — | — | — | — |
| Weight average molecular weight | 330,000 | 180,000 | 300,000 | 290,000 | 310,000 | 200,000 | 200,000 | 310,000 | 310,000 |

In Table 1, DMAAm denotes N,N-dimethylacrylamide, DMAEA denotes, AN denotes acrylonitrile, DMAEA denotes 2-dimethylaminoethyl acrylate, DMAPA denotes 3-dimethylaminopropyl acrylate, AA denotes acrylic acid, HBA denotes 4-hydroxybutyl acrylate, EA denotes ethyl acrylate, and BA denotes n-butyl acrylate.

Manufacture of Separator

Example 1

Separator Coated with Inorganic Particle/Binder Polymer Slurry

A binder polymer solution of 6 weight % was prepared by dissolving 100 parts by weight of the acryl-based copolymer of Preparation example 1 and 6.8 parts by weight of a toluene diisocyanate adduct as an isocyanate-based crosslinking agent in 1,674 parts by weight of acetone. A slurry having a weight ratio of binder polymer/inorganic particle=5/95 was prepared by mixing 13 parts by weight of the prepared binder polymer solution with 15 parts by weight of $Al_2O_3$ as inorganic particles, and coated on both surfaces of a 12 μm thick porous polyethylene film (45% porosity) by a dip coating method, and curing and drying was performed in a 80° C. drying oven for 10 minutes. Finally, a separator having a coating layer, of which thickness was adjusted to about 2 μm on one surface, was manufactured.

Examples 2 Through 7

Separators were manufactured by the same method as Example 1, except that the slurry of the composition and the drying and curing temperature and time shown in Table 2 were applied.

Comparative Examples 1 Through 7

Separators were manufactured by the same method as Example 1, except that the slurry of the composition and the drying and curing temperature and time shown in Table 2 were applied.

TABLE 2

|  | Type of binder polymer | Content of binder polymer (parts by weight) | Content of inorganic particles (parts by weight) | Content of crosslinking agent (parts by weight based on 100 parts by weight of binder) | Drying and curing temperature (° C.) | Drying and curing time (min) | Total thickness after coating (μm) |
|---|---|---|---|---|---|---|---|
| Example 1 | Manufacture example 1 | 5 | 95 | 6.8 | 80 | 5 | 16 ± 0.5 |
| Example 2 | Manufacture example 1 | 3 | 97 | 6.8 | 80 | 10 | 16 ± 0.5 |
| Example 3 | Manufacture example 2 | 5 | 95 | 10 | 70 | 5 | 16 ± 0.5 |
| Example 4 | Manufacture example 2 | 10 | 90 | 10 | 70 | 5 | 16 ± 0.5 |
| Example 5 | Manufacture example 3 | 5 | 95 | 6.8 | 80 | 5 | 16 ± 0.5 |
| Example 6 | Manufacture example 4 | 5 | 95 | 0.5 | 100 | 10 | 16 ± 0.5 |
| Example 7 | Manufacture example 4 | 5 | 95 | 2 | 70 | 15 | 16 ± 0.5 |
| Comparative example 1 | Manufacture example 5 | 5 | 96 | 6.8 | 80 | 10 | 16 ± 0.5 |
| Comparative example 2 | Manufacture example 5 | 5 | 96 | 6.8 | 80 | 180 | 16 ± 0.5 |
| Comparative example 3 | Manufacture example 6 | 5 | 95 | 6.8 | 80 | 60 | 16 ± 0.5 |
| Comparative example 4 | Manufacture example 7 | 5 | 95 | 5 | 100 | 15 | 16 ± 0.5 |
| Comparative example 5 | Manufacture example 8 | 5 | 95 | 10 | 70 | 5 | 16 ± 0.5 |
| Comparative example 6 | Manufacture example 8 | 5 | 95 | 15 | 70 | 5 | 16 ± 0.5 |
| Comparative example 7 | Manufacture example 9 | 5 | 95 | 0 | 70 | 5 | 16 ± 0.5 |

Test Example 1

Evaluation of Performance of Separator

The manufactured separator was tailored into a size of 50 mm×50 mm, and measured by the following method for an adhesive strength, air permeability, thermal stability, resistance to electrolyte solution, and a packing density D of the porous coating layer. The results are shown in Table 3.

The resistance to electrolyte solution was measured such that the separators manufactured in the examples and comparative examples were tailored to a size of 1 cm×5 cm, soaked in an electrolyte solution (ethylene carbonate (EC)/ethylmethyl carbonate (EMC)=1/2 (volumetric ratio), lithiumhexafluorophosphate (1 mol $LiPF_6$)), and taken out, and a degree of delamination on the interface of the coating layer and the porous polyolefin film was calculated on the basis of area.

⊚: No delamination of the coating layer and the porous film

○: Delamination of the coating layer and the porous film less than 5% x: Delamination of the coating layer and the porous film greater than or equal to 5%

The adhesive strength was measured such that the separators manufactured in the examples and comparative examples were tailored to specimens having a size of 100 mm×15 mm, attached onto glass having a double-sided tape adhered thereto, delaminated on the interface of the coating layer and the porous polyolefin film at a tension speed of 0.3 m/min, and measured using a texture analyzer (Stable micro systems). Each specimen was measured five times or more, and an average value was calculated.

The air permeability was evaluated, for the separators manufactured in the examples and comparative examples, as the time (s) taken for 100 ml air to completely pass through the separator.

The thermal stability was measured such that the separators manufactured in the examples and comparative examples were tailored to specimens having a size of 5 cm×5 cm and measured for a dimensional change after storage at 15° C. for 30 minutes.

○: Dimensional change of length and width that is less than 30% x: Dimensional change of length and width that is greater than or equal to 30%

The packing density D of the porous coating layer is defined as the density of the porous coating layer loaded at a height of 1 μm from the porous substrate per unit area ($m^2$) of the porous substrate, and was calculated by the following equation:

$$D=(Sg-Fg)/(St-Ft),$$

where Sg is the weight (g) per unit area ($m^2$) of the separator in which the porous coating layer is formed on the porous substrate, Fg is the weight (g) of the unit area ($m^2$) of the porous substrate, St is the thickness (μm) of the separator in which the porous coating layer is formed on the porous substrate, and Ft is the thickness (μm) of the porous substrate.

The electrical resistance was measured such that a half coin cell was manufactured by injecting an electrolyte solution (EC:DMC=1:2 volume %, 1.0 mol $LiPF_6$) into the separators manufactured in the examples and comparative examples and measured for resistance.

TABLE 3

| | Type of binder polymer | Total thickness after coating (μm) | Resistance to electrolyte solution | Adhesive strength (gf/15 mm) | Air permeability (S/100 mL, air) | Packing density (g/cm³) | Thermal stability | Electrical resistance of coin cell (Ω) |
|---|---|---|---|---|---|---|---|---|
| Example 1 | Manufacture example 1 | 16 ± 0.5 | ⊚ | 42 | 205 | 2.29 | ○ | 0.889 |
| Example 2 | Manufacture example 1 | 16 ± 0.5 | ⊚ | 38 | 195 | 2.19 | ○ | 0.901 |
| Example 3 | Manufacture example 2 | 16 ± 0.5 | ⊚ | 32 | 201 | 2.31 | ○ | 0.931 |
| Example 4 | Manufacture example 2 | 16 ± 0.5 | ⊚ | 32 | 205 | 2.24 | ○ | 0.928 |
| Example 5 | Manufacture example 3 | 16 ± 0.5 | ⊚ | 34 | 202 | 2.21 | ○ | 0.910 |
| Example 6 | Manufacture example 4 | 16 ± 0.5 | ⊚ | 40 | 207 | 2.14 | ○ | 0.915 |
| Example 7 | Manufacture example 4 | 16 ± 0.5 | ⊚ | 37 | 202 | 2.14 | ○ | 0.922 |
| Comparative example 1 | Manufacture example 5 | 16 ± 0.5 | X | 38 | 196 | 2.23 | ○ | 1.192 |
| Comparative example 2 | Manufacture example 5 | 16 ± 0.5 | ○ | 36 | 190 | 2.30 | ○ | 0.923 |
| Comparative example 3 | Manufacture example 6 | 16 ± 0.5 | ⊚ | 38 | 205 | 2.17 | ○ | 0.905 |
| Comparative example 4 | Manufacture example 7 | 16 ± 0.5 | X | 36 | 204 | 2.29 | ○ | 1.235 |
| Comparative example 5 | Manufacture example 8 | 16 ± 0.5 | ⊚ | <15 | 191 | 2.13 | ○ | 1.127 |
| Comparative example 6 | Manufacture example 8 | 16 ± 0.5 | ⊚ | <15 | 187 | 2.07 | ○ | 1.089 |
| Comparative example 7 | Manufacture example 9 | 16 ± 0.5 | X | 35 | 207 | 2.25 | ○ | 1.235 |

Fabrication of Lithium Secondary Battery

Example 8

Production of Anode

An anode mixture slurry was prepared by adding 96 wt % of carbon powder as an anode active material, 3 wt % of polyvinylidene fluoride (PVdF) as a binder, and 1 wt % of carbon black as a conductive material to N-methyl-2-pyrrolidone (NMP) as a solvent. An anode was produced by applying the anode mixture slurry to a 10 μm thick copper (Cu) foil as an anode current collector, drying, and roll pressing.

Production of Cathode

A cathode mixture slurry was prepared by adding 92 wt % of lithiated cobalt composite oxide as a cathode active material, 4 wt % of carbon black as a conductive material, and 4 wt % of PVDF as a binder to N-methyl-2-pyrrolidone (NMP) as a solvent. A cathode was produced by applying the cathode mixture slurry to a 20 μm thick aluminum (Al) foil as a cathode current collector, drying, and roll pressing.

Fabrication of Lithium Secondary Battery

A lithium secondary battery was fabricated by constructing an electrode assembly using the separator manufactured in Example 1 between the above anode and the above cathode by a stacking method, and injecting an electrolyte solution (ethylene carbonate (EC)/ethyl methyl carbonate (EMC)=1/2 (volume ratio), 1 mol LiPF$_6$).

Examples 9 Through 14

Lithium secondary batteries were fabricated by the same method as Example 8, except that the separators of Examples 2 through 7 were each used.

Comparative Examples 8 Through 14

Lithium secondary batteries were fabricated by the same method as Example 8, except that the separators of Comparative examples 1 through 7 were each used.

Test Example 2

Evaluation of Performance of Lithium Secondary Battery

Hot Box Test

The batteries fabricated using the separators manufactured in Examples 8 through 14 and Comparative examples 8 through 14 were observed for stability (explosion) in a completely charged state during storage at 150° C. or 160° C. for 1 to 2 hours.

o: No explosion
x: Explosion occurred

TABLE 4

| | 150° C. | | 160° C. | |
|---|---|---|---|---|
| | 1 hour | 2 hours | 1 hour | 2 hours |
| Example 8 | o | o | o | o |
| Example 9 | o | o | o | o |
| Example 10 | o | o | o | o |
| Example 11 | o | o | o | o |
| Example 12 | o | o | o | o |
| Example 13 | o | o | o | o |
| Example 14 | o | o | o | o |
| Comparative example 8 | o | o | o | x |
| Comparative example 9 | o | o | o | o |
| Comparative example 10 | o | o | o | o |
| Comparative example 11 | o | o | o | x |

TABLE 4-continued

| | 150° C. | | 160° C. | |
| --- | --- | --- | --- | --- |
| | 1 hour | 2 hours | 1 hour | 2 hours |
| Comparative example 12 | ○ | ○ | ○ | ○ |
| Comparative example 13 | ○ | ○ | ○ | ○ |
| Comparative example 14 | ○ | ○ | ○ | x |

What is claimed is:

1. A separator comprising:
a porous substrate having a plurality of pores; and
a porous coating layer provided on at least one surface of the porous substrate and formed from a mixture of plural inorganic particles and a binder polymer,
wherein the binder polymer includes a composition comprised of an acryl-based copolymer cured with an isocyanate-based crosslinking agent,
the acryl-based copolymer is a copolymer including (a) a first monomer unit with a tertiary amine group, (b) a second monomer unit with at least one functional group selected from an amine group other than a tertiary amine group, an amide group, a cyano group, and an imide group, (c) a third monomer unit of (meth)acrylate with a carboxyl group, (d) a fourth monomer unit of (meth)acrylate with a hydroxyl group, and (e) a fifth monomer unit of (meth)acrylate with an alkyl group having 1 to 14 carbon atoms, and
a content of the first monomer unit is 0.5 to 20 parts by weight, a content of the second monomer unit is 30 to 60 parts by weight, a content of the third monomer unit is 0.1 to 2 parts by weight, a content of the fourth monomer unit is 0.5 to 10 parts by weight, and a content of the fifth monomer unit is 8 to 68 parts by weight, based on the total acryl-based copolymer.

2. The separator according to claim 1, wherein a content of the isocyanate-based crosslinking agent is 0.1 to 10 parts by weight based on 100 parts by weight of the acryl-based copolymer.

3. The separator according to claim 1, wherein the first monomer unit is derived from at least one monomer selected from the group consisting of 2-(diethylamino)ethyl(meth)acrylate, 2-(dimethylamino)ethyl(meth)acrylate, 3-(diethylamino)propyl(meth)acrylate, and 3-(dimethylamino)propyl(meth)acrylate.

4. The separator according to claim 1, wherein the second monomer unit is derived from at least one monomer selected from the group consisting of 2-(((butoxyamino)carbonyl)oxy)ethyl(meth)acrylate, methyl 2-acetamido(meth)acrylate, 2-(meth)acrylamidoglycolic acid, 2-(meth)acrylamido-2-methyl-1-propanesulfonic acid, (3-(meth)acrylamidopropyl)trimethylammonium chloride, N-(meth)acryloylamidoethoxyethanol, 3-(meth)acryloylamino-1-propanol, N-(butoxymethyl)(meth)acrylamide, N-tert-butyl(meth)acrylamide, diacetone(meth)acrylamide, N,N-dimethyl(meth)acrylamide, N-(isobutoxymethyl)acrylamide, N-(isopropyl)(meth)acrylamide, (meth)acrylamide, N-phenyl(meth)acrylamide, N-(tris(hydroxymethyl)methyl)(meth)acrylamide, N-vinylpyrrolidinone, N,N'-(1,3-phenylene)dimaleimide, N,N'-(1,4-phenylene)dimaleimide, N,N'-(1,2-dihydroxyethylene)bisacrylamide, N,N'-ethylenebis(meth)acrylamide, 4-(meth)acryloyl morpholine, (meth)acrylonitrile, 2-(vinyloxy)ethanenitrile, 2-(vinyloxy)propanenitrile, cyanomethyl(meth)acrylate, cyanoethyl(meth)acrylate, and cyanopropyl(meth)acrylate.

5. The separator according to claim 1, wherein the third monomer unit is derived from at least one monomer selected from the group consisting of (meth)acrylic acid, 2-(meth)acryloyloxy acetic acid, 3-(meth)acryloyloxy propylic acid, 4-(meth)acryloyloxy butyric acid, an acrylic acid dimer, itaconic acid, maleic acid, and maleic anhydride.

6. The separator according to claim 1, wherein the fourth monomer unit is derived from at least one monomer selected from the group consisting of 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate, and 2-hydroxypropyleneglycol(meth)acrylate.

7. The separator according to claim 1, wherein the fifth monomer unit is derived from at least one monomer selected from the group consisting of methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylbutyl(meth)acrylate, 2-ethylhexyl(meth)acrylate, n-octyl(meth)acrylate, isooctyl(meth)acrylate, isononyl(meth)acrylate, lauryl(meth)acrylate, and tetradecyl(meth)acrylate.

8. The separator according to claim 1, wherein the isocyanate-based crosslinking agent is at least one selected from the group consisting of 4,4-methylenebisdicyclohexyl diisocyanate, hexamethylene diisocyanate (HDI), isophorone diisocyanate (IPDI), methylenebis(cyclohexyl isocyanate), trimethyl hexamethylene diisocyanate (TMDI), meta-tetramethylxylylene diisocyanate (TMXDI), cyclohexylene diisocyanate, toluene diisocyanate (TDI), diphenylmethane-4,4-diisocyanate (MDI), naphthalene-1,5-diisocyanate (NDI), 3,3-dimethyl 4,4-biphenylene diisocyanate (TODI), xylylene diisocyanate (XDI), and phenylene diisocyanate, or results of reaction with polyol thereof.

9. The separator according to claim 1, wherein the binder polymer further includes any one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxylmethyl cellulose, or mixtures thereof.

10. The separator according to claim 1, wherein the inorganic particles have a particle size of 0.001 to 10 μm.

11. The separator according to claim 1, wherein the inorganic particles are selected from the group consisting of an inorganic particle having a dielectric constant greater than or equal to 5, an inorganic particle having an ability to transport lithium ions, and a mixture thereof.

12. The separator according to claim 11, wherein the inorganic particle having the dielectric constant greater than or equal to 5 is at least one selected from the group consisting of $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, and $TiO_2$.

13. The separator according to claim 11, wherein the inorganic particle having the ability to transport lithium ions is at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ based glass ($Li_xSi_yS_z$, $0<x<3$, $0<y<2$, $0<z<4$), and $P_2S_5$ based glass ($Li_xP_yS_z$, $0<x<3$, $0<y<3$, $0<z<7$).

14. The separator according to claim 1, wherein a content of the binder polymer is 2 to 30 parts by weight based on 100 parts by weight of the inorganic particles.

15. The separator according to claim 1, wherein the porous coating layer has a thickness of 0.5 to 10 μm.

16. The separator according to claim 1, wherein the porous substrate is formed from at least one selected from the group consisting of polyolefin, polyethylene terephthalate, polybutylene terephthalate, polyacetal, polyamide, polycarbonate, polyimide, polyether ether ketone, polyethersulfone, polyphenylene oxide, polyphenylene sulfide, and polyethylene naphthalene.

17. An electrochemical device comprising a cathode, an anode, and a separator interposed between the cathode and the anode, wherein the separator is a separator according to claim 1.

18. The electrochemical device according to claim 17, wherein the electrochemical device is a lithium secondary battery.

* * * * *